United States Patent [19]

Goodman

[11] 4,342,095

[45] Jul. 27, 1982

[54] COMPUTER TERMINAL

[75] Inventor: Richard W. Goodman, Ann Arbor, Mich.

[73] Assignee: Harris Corporation, Melbourne, Fla.

[21] Appl. No.: 26,026

[22] Filed: Apr. 2, 1979

[51] Int. Cl.³ .......................... G06F 9/32; G06F 3/153
[52] U.S. Cl. ..................................... 364/900; 340/799
[58] Field of Search ... 364/200 MS File, 900 MS File, 364/521; 340/802, 798, 799

[56] References Cited

U.S. PATENT DOCUMENTS

| | | | |
|---|---|---|---|
| 3,895,357 | 7/1975 | Schwartz et al. | 364/200 |
| 3,906,453 | 9/1975 | Mattedi et al. | 364/200 |
| 3,911,403 | 10/1975 | O'Neill | 364/900 |
| 4,054,948 | 10/1977 | Grier et al. | 364/900 |
| 4,080,659 | 3/1978 | Francin | 364/715 |
| 4,103,331 | 7/1978 | Thacker | 364/200 |
| 4,115,765 | 9/1978 | Hartke | 340/799 X |
| 4,121,283 | 10/1978 | Walker | 364/200 |
| 4,197,590 | 4/1980 | Sukonick et al. | 364/900 |

OTHER PUBLICATIONS

Motorda, M6800 Microprocessor Applications Manual, pp. 1-32,33, 1975.

*Primary Examiner*—Gareth D. Shaw
*Assistant Examiner*—Thomas M. Heckler
*Attorney, Agent, or Firm*—Yount & Tarolli

[57] ABSTRACT

A computer terminal is disclosed which may advantageously be employed as a video display terminal having editing capabilities. The terminal is a processor driven terminal having a common bus architecture. This includes a central processing unit CPU having its own internal instruction set together with facilities for operating under program control from an external memory, such as an EPROM. Data may be inputted by way of a keyboard or other peripheral, such as a host computer, for storage in a read/write external memory, such as a random access memory (RAM). When used as video display terminal data stored in the RAM may be outputted for display, as by a CRT. The terminal is constructed so that data may be fetched from the random access memory (RAM) by addressing the RAM using a program counter within the CPU, as opposed to the use of a direct memory access circuit DMA. Additionally, when used as a video display terminal, provisions have been made for controlling video display circuitry from a video control and timing circuit which provides the various timing required without the need to use a synchronizing signal generated as by a typical TV monitor circuit.

17 Claims, 8 Drawing Figures

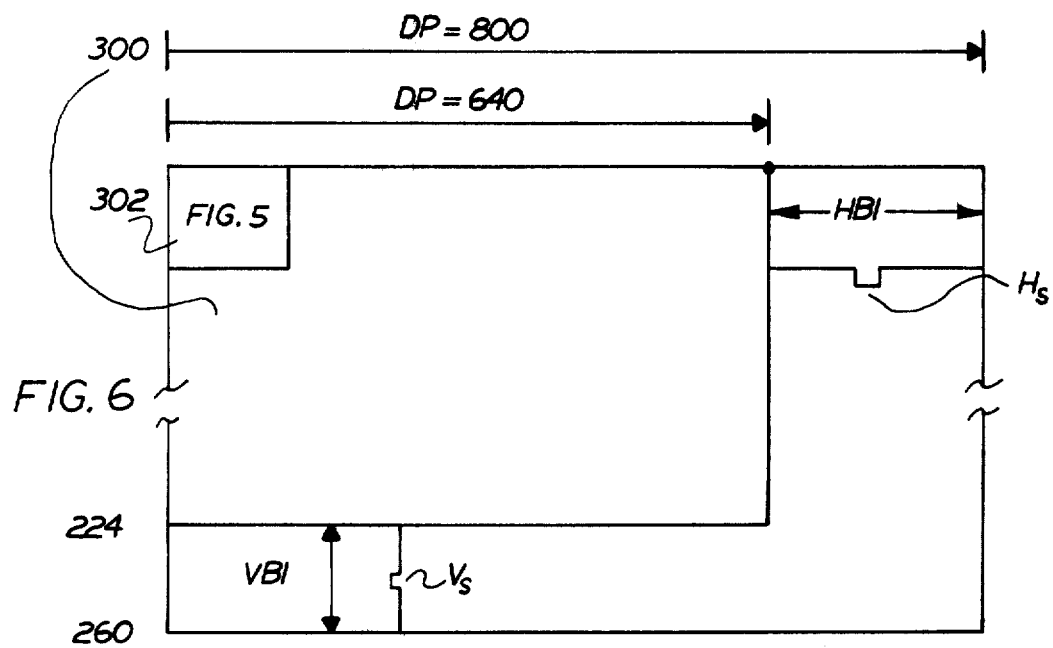
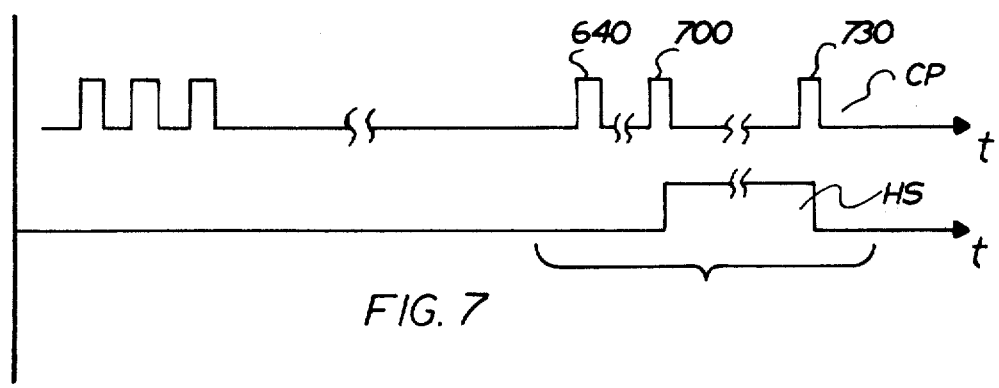
FIG. 7
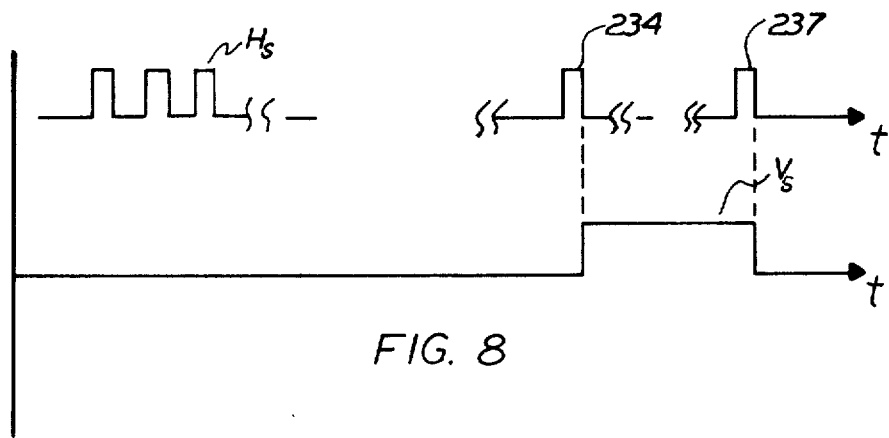
FIG. 8

COMPUTER TERMINAL

BACKGROUND AND FIELD OF THE INVENTION

This invention relates to a data processing system and, more particularly, to an improved processor driven terminal structured so as to obviate the need for a direct memory access circuit and to improvements in controlling the timing of a video display.

Whereas the invention will be described in conjunction with a video display terminal capable for use as an editing terminal, as in electronic newsroom operation and the like, it is to be understood that the invention has other applications requiring the need for data processing.

At this stage in the art, a microprocessor typically comprises a central processing unit (CPU) and related circuitry mounted on a single chip; that is, a single integrated circuit. A microprocessor system includes such a central processing unit CPU, sometimes referred to as a microprocessor unit MPU, together with other circuitry including external memory. This is all connected to the CPU by a way of a bus structure which couples the CPU with external memory such as a read only memory (ROM) and a random access read/write memory (RAM). Data to be processed may be entered as by way of a tape, host computer, or by a keyboard and this data is entered by way of the bus structure to the read/write memory. The processing is typically controlled by an instruction set located in the read only memory, ROM. Data may be outputted to such output peripherals as a printer, control mechanism or a video display, including a cathode ray tube CRT. A processor driven video display terminal includes such a CPU, external memory, a keyboard and a video display. Such a processor driven video display terminal is frequently referred to as a "intelligent" video display terminal.

Intelligent terminals may be interactive with a host computer so that instruction sets as well as data may be downloaded into a random access memory. In other cases only data is downloaded and all instruction sets are preprogrammed in the read only memory ROM or they may be field variable as by a programmable read only memory PROM or by an electrically programmable read only memory, EPROM.

In these variations of processor driven systems, instructions are fetched from external memory by outputting addresses on the common bus structure. The address is a multibit binary word, typically sixteen bits. The address is typically obtained from a program counter located within the central processing unit, CPU. The term "counter" is somewhat loosely used in the art since it sometimes serves as merely an address register and receives the address of the next instruction from some other source. Frequently, the counter acts in the capacity of a counter and is periodically incremented by one count to provide the next instruction address. Sometimes the counter acts in one mode as a counter and in another mode it is forced to a particular count by loading a number into it from another source. This "number" or "count" serves as an address and is placed on the address bus of the bus structure to address the external memory (such as a read only memory) to obtain the next instruction.

The instruction so fetched determines how data stored in the data memory, such as the read/write or RAM memory, is to be processed. This data memory must also be addressed and this is done by a different addressing circuit then that employed for addressing the instructions. Frequently this data addressing circuit is known as a direct memory access (DMA) circuit. It represents one more chip in the "chipcount" needed to construct such a processing system. As the chipcount increases there is a corresponding increase in size of the processing system as well as in production time, complexity and, hence, cost of manufacture.

It is desirable, therefore, that to minimize the size of such a processing system as well as to minimize the expenses of construction, the "chipcount" should be minimized. In accordance with one aspect of the present invention this is achieved by employing the program counter of the CPU to provide the addresses for addressing the read/write memory (RAM) to obtain data for an input or output device. This, then, will obviate the need for a separate addressing circuit, such as a direct memory access circuit (DMA).

A video display terminal typically requires substantial apparatus for obtaining synchronization of operation both in the fetching of characters to be displayed and in the displaying of the characters. For example, data is obtained from a read/write memory and loaded into a temporary line buffer memory from which the data is supplied to a character generator from which dot patterns are obtained to use in generating characters on the face of a display means, such as a cathode ray tube CRT. During this operation the line buffer must be loaded with data representing characters and, once loaded, the contents must be outputted to a character generator. Additionally the outputs obtained from the character generator are applied to a character forming circuitry which, for example, may include an output shift registers. These operations must be synchronized. If the terminal be processor driven, then these various operations which require synchronization should be done in synchronization with the operation of the processor. For example, data to be retrieved from the main memory and loaded into the line buffer typically requires some operation by the CPU in conjunction with a direct memory access circuit. This operation must be synchronized so as to not interrupt other data processing operations and so as to not take place during video display time. Typically, substantial counter circuitry is required to synchronize these various operations. Additionally, the operations are usually synchronized to a line frequency signal or to a synchronization signal provided by a TV monitor circuit.

One aspect of the present invention deals with simplifying the circuitry employed to achieve video control and timing in a video display terminal. This is achieved with a more simplified circuitry which provides sequence control. Preferably, the sequence controller includes a microcomputer which operates to provide the required synchronization and timing signals.

SUMMARY OF THE INVENTION

One aspect of the present invention contemplates that a system be provided wherein a data processor is provided with a program counter which provides addresses for addressing an external memory to obtain instructions therefrom. In accordance with this aspect of the invention, the memory has a first group of addressable storage locations for providing the instruction data and a second group of addressable locations for providing other data. Supply of the other data to a data utilization device is controlled by jamming a selected instruction into the processor for an interval while sequentially incrementing the program counter so that during this interval the program counter sequentially provides memory addresses corresponding with selected ones of the second group of addressable storage locations.

In accordance with another aspect of the present invention a video display terminal includes a memory for storing and supplying coded data characters representative of characters to be displayed by a video display means. A block of data characters is fetched from the memory during a first time period and representations thereof are displayed during a second time period. A video control and timing circuit provides all the timing and control signal for fetching the data characters and driving the circuitry for effecting display of the characters.

BRIEF DESCRIPTION OF THE DRAWINGS

The foregoing and other objects and advantages of the invention will become more readily apparent from the following description of the preferred embodiment of the invention as taken in conjunction with the drawings which are a part hereof in wherein:

FIG. 6 is a graphical illustration of a CRT screen.

FIG. 7 is a graphical waveform showing a horizontal synchronization signal; and, FIG. 8 is a graphical waveform showing a vertical synchronization signal.

DETAILED DESCRIPTION

General Description

Reference is now made to the drawings wherein the showings are for purposes of illustrating a preferred embodiment of the invention only and not for purposes of limiting same.

Figure 1:
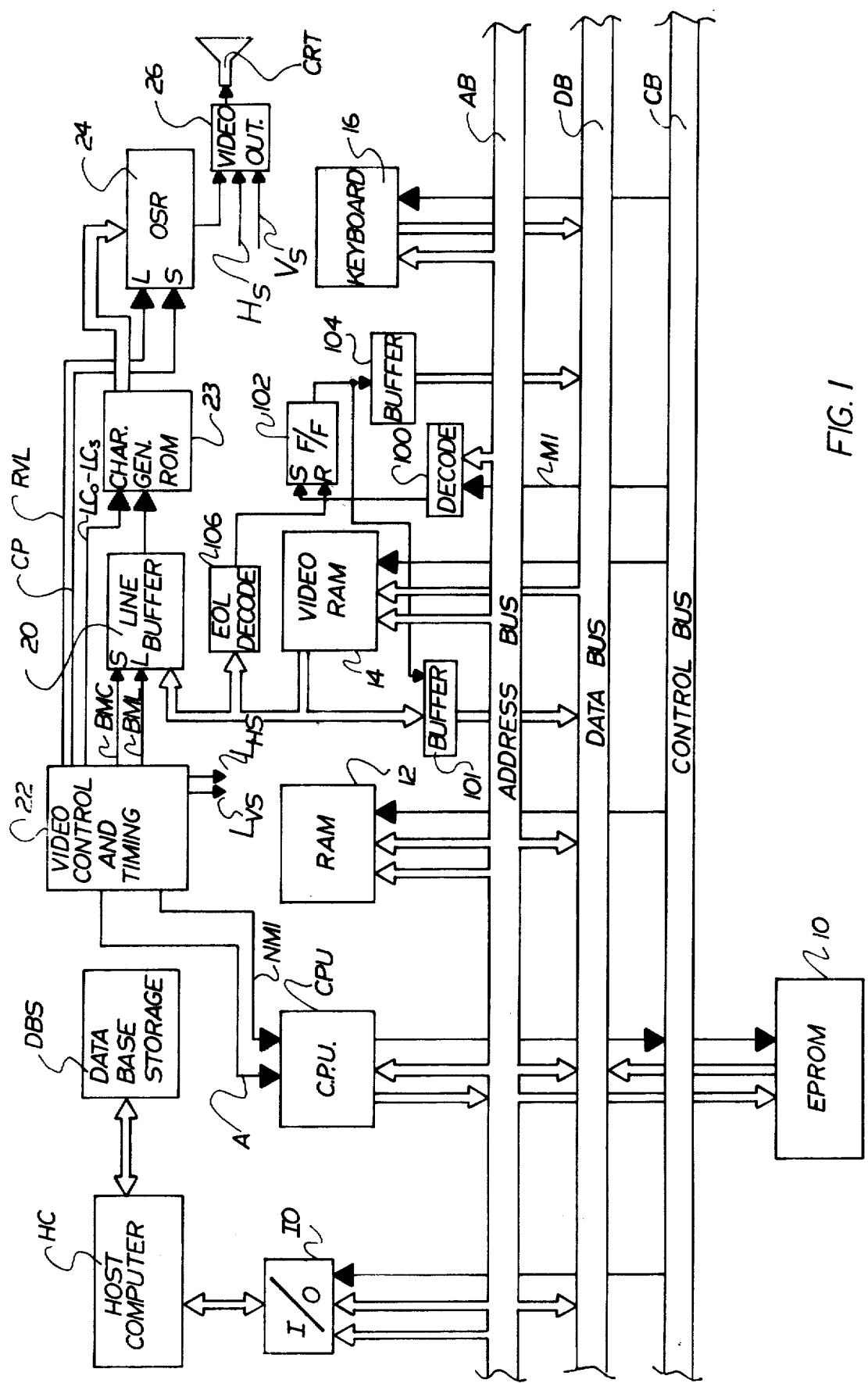
FIG. 1 is a schematic-block diagram illustration of a video display terminal constructed in accordance with the present invention.

FIG. 1 is a schematic-block diagram illustration of a video display terminal incorporating the present invention. The terminal is a processor driven terminal employing a common bus structure. The bus structure may be divided into an address bus AB, a data bus DB, and a control bus CB. By way of an example only, the address bus may be a sixteen bit bus and the data bus may be an eight bit bus. An interface to the host computer HC is obtained with a conventional input-output control IO. The input-output control 10, in a conventional manner, communicates with the address bus, the data bus, and the control bus. Also connected to the common bus is a central processing unit CPU, and external memories 10, 12, and 14. Memory 10 stores the instruction sets for the CPU and may take the form of a read only memory (ROM). In the example being illustrated, it is an electrically programmable read only memory, EPROM. The instruction sets are obtained from memory in response to a program counter in the CPU placing an address on the address bus AB. Memory 10 then responds by outputting data in the form of an instruction set to the data bus DB.

Data to be manipulated by the processor is stored in a read/write memory. For purposes of illustration, two read/write memories 12 and 14 are shown. Read/write memory 12 serves, in effect, as a scratch pad memory or temporary memory to facilitate operations of the CPU. For example, the type of data that may be stored in memory 12 might include the address in memory 10 of a next instruction set. This would be obtained from the program counter within the CPU. The address for the next instruction might be stored in memory 12 at times when a jump routine is being executed so that the program count of the next instruction may be maintained. A stack pointer located in the CPU would be set to the address in memory 12 where the last program count is stored.

The bulk of the data, such as data to be displayed by the CRT is stored in another read/write memory 14. In practice, memories 12 and 14 may all be on one memory card or on several related memory cards and are illustrated herein and described as two cards or two memories for purposes of simplification. Data to be displayed by the CRT or otherwise manipulated by the CPU may be obtained from an input peripheral such as a keyboard 16 or a host computer HC or a tape reader and the like. In the example given, data stored in memory 14 may be obtained from either the keyboard 16 or from the host computer. The host computer will communicate with a large data base storage DBS where stories and the like to be edited by an operator are stored. An operator will utilize the keyboard 16 to communicate with the host computer by way of the input-output control IO to obtain a story from the data base storage. This data will be entered into memory 14 from which it can be retrieved for display by the cathode ray tube CRT. Text to be displayed is stored as lines of characters in memory 14 with each line of characters being stored in an addressable location associated with the first character in that line. The remaining characters may be stored in successively adjacent locations in the memory.

The video display in the embodiment being described herein is preferrably a TV tape raster scan with each character being composed of a plurality of dots such as within a 7 by 9 dot matrix. The character codes stored in memory 14 are loaded a line of characters at a time into a line buffer 20. The timing for loading each line of characters into buffer 20 is established by a video control and timing circuit 22, to be described in greater detail hereinafter. A line of data characters is loaded into the line buffer 20 when the video control and timing circuit 22 raises its buffer memory load line BML. This takes place during a nonvideo time interval; that is, during a period in which characters are not being generated on the screen of the cathode ray tube. The character codes are outputted from the line buffer 20 one character code at a time in synchronism with buffer memory clock pulses BMC obtained from the video control and timing circuit 22 and applied to the shift input of the line buffer 20. These character codes as outputted from the line buffer 20 are applied as multibit addresses to a character generator read only memory (ROM) 23.

Figure 5:
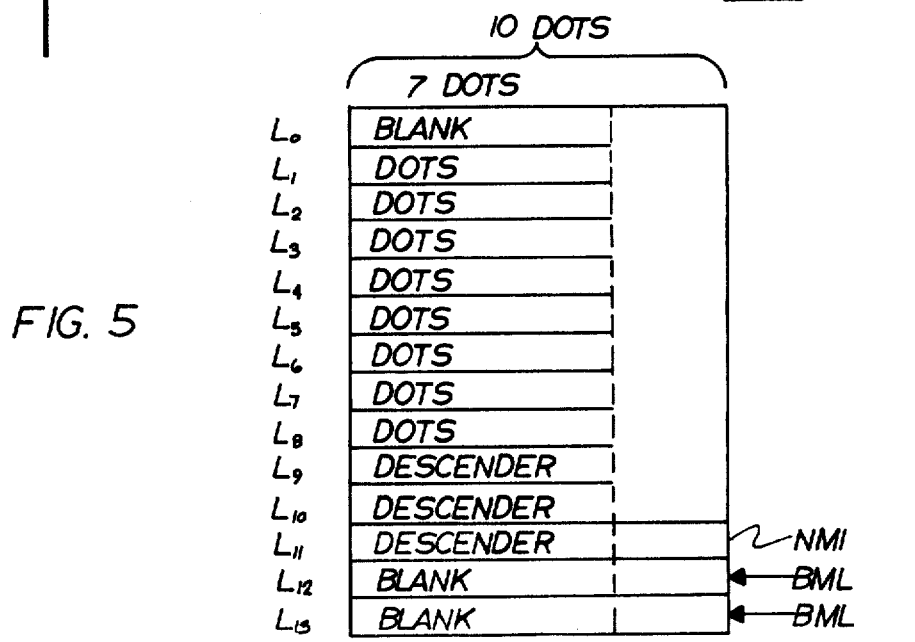
FIG. 5 is a graphical illustration of a dot matrix character field portion of a CRT screen.

Memory 23 serves, in a conventional fashion, to store a font or dot patterns for the various characters and symbols which are displayable by the cathode ray tube CRT. Each dot character or symbol is displayable within a 7 by 9 dot matrix pattern. So that there is sufficient spacing between adjacent characters on a line and so that there is sufficient interline spacing this matrix pattern falls within a larger character field, such as a 10 by 14 dot matrix. The address for addressing a dot pattern stored in memory 23 is obtained from line buffer 20 and from a four line coded line count $LC_0$ to $LC_3$ obtained from the video control and timing circuit 22. During the generation of a line of characters with a TV raster scan, each scan lays down one slice or dot pattern segment of each of the characters on a line. Succeeding scans provide the remaining slices or dot segments. Consequently then, for a 10 by 14 dot character field as shown in FIG. 5, 14 scan lines may be required. This means that for each character generated the memory 22 must be addressed at least eleven times for the eleven dot segments and this line of data characters in the line buffer 20 will be recirculating at least eleven times and the count provided by the line count pattern $LC_0$ through $LC_3$ will be incremented with each recirculation. The address then for each dot pattern segment is a combination of the line count together with the character code obtained from the buffer 20.

Each time a line segment dot pattern is outputted from memory 23 it appears as a 7 bit pattern which is loaded in parallel into an output shift register 24 when that register receives a load signal. This takes the form of a ROM video load signal RVL which is obtained from the video control and timing circuit 22. The dot pattern is shifted in bit serial fashion out of the output shift register 24 in synchronism with shift or clock pulses supplied to the shift input of register 24. The shift pulses or clock pulses CP are supplied to the shift input of register 24 from the video control and timing circuit 22.

As is conventional, the dot pattern segments control the blanking-unblanking operation of the cathode ray tube. As the beam is being scanned horizontally across the screen, a dot pattern is displayed with each line segment being in accordance with the associated bit pattern outputted from register 24. At the end of a scan line there will be an interval which may be considered as the horizontal blanking internal HBI. It is during this interval that a horizontal synchronization signal $H_S$ is provided by the video control and timing circuit 22. This actuates the video output circuit 26 to cause the beam to fly back or retrace to its return location where the beam is automatically incremented downwardly by one scan line in a position to commence tracing of a second scan line across the face of the cathode ray tube. These scans will continue through a character line which, in the embodiment being described, will require fourteen scan lines. The number of visible character lines in a vertical direction will be determined in large measure by the size of the cathode ray tube. In the example being given there may be on the order of sixteen character lines, each requiring fourteen scan lines for a total of 224 scan lines. If the capacity of the screen is 260 scan lines then a vertical blanking interval at the bottom of the screen will account for approximately 36 scan lines. It is during this interval that a vertical synchronization signal $V_S$ is generated by the video control and timing circuit 22. This actuates the video output circuit 26, to cause the beam to retrace itself to its home position, normally located in the upper lefthand corner of the CRT.

From the foregoing it is seen that the timing of such events as loading the line buffer 20, shifting data out of the line buffer, addressing ROM 23 and loading its dot patterns into the output shift register 24 and clocking the dot patterns therefrom, together with horizontal synchronization and vertical synchronization are all controlled by the video control and timing circuit 22 to be described in greater detail hereinafter.

Fetching Data From The Video Memory

Typically a processor driven terminal of the type being described herein has data stored in an external memory, such as the memory 14. The data is typically fetched with the aid of a direct memory access circuit DMA. Such circuitry includes address circuitry and timing and logic circuitry. The addressing circuitry will typically perform a repetitious sequence of addressing functions required by the system under the control of the timing logic circuitry. For example the addressing circuitry might perform such functions as generating vector table addresses which would be used to access memory 14 during a vector fetch mode to obtain starting addresses of the character data for each line of display. A second function might be to store and update certain line vectors and present these vectors as addresses to the memory 14 during character generator data fetching operations. The data obtained from such fetches would be character codes and these would then be stored in a line buffer such as buffer 20 for use by the video generator circuitry. The accompanying timing logic circuitry for such a DMA would serve to control the sequence of events within a vector fetch operation and a data fetch operation.

In accordance with the present invention such direct memory access circuitry is made unnecessary. Instead, as will be brought out in detail hereinafter, data is fetched from memory 14 and supplied to the line buffer 20 for use by the video generator circuitry by utilizing the CPU program counter to provide the addresses to fetch data from memory 14. This then minimizes the complexity as well as the chip count required to construct a data processing system.

Referring again to FIG. 1, the data processing system includes a central processor CPU. As previously discussed this is a microprocessor and may take any convenient form of microprocessor such as, for example, one supplied by Zilog Inc. and known as their model Z-80. That processor is an eight bit machine having an eight bit bidirectional data bus, a sixteen bit address bus, and has addressing capabilities to access 64,000 eight bit bytes of data in memory.

Figure 2:
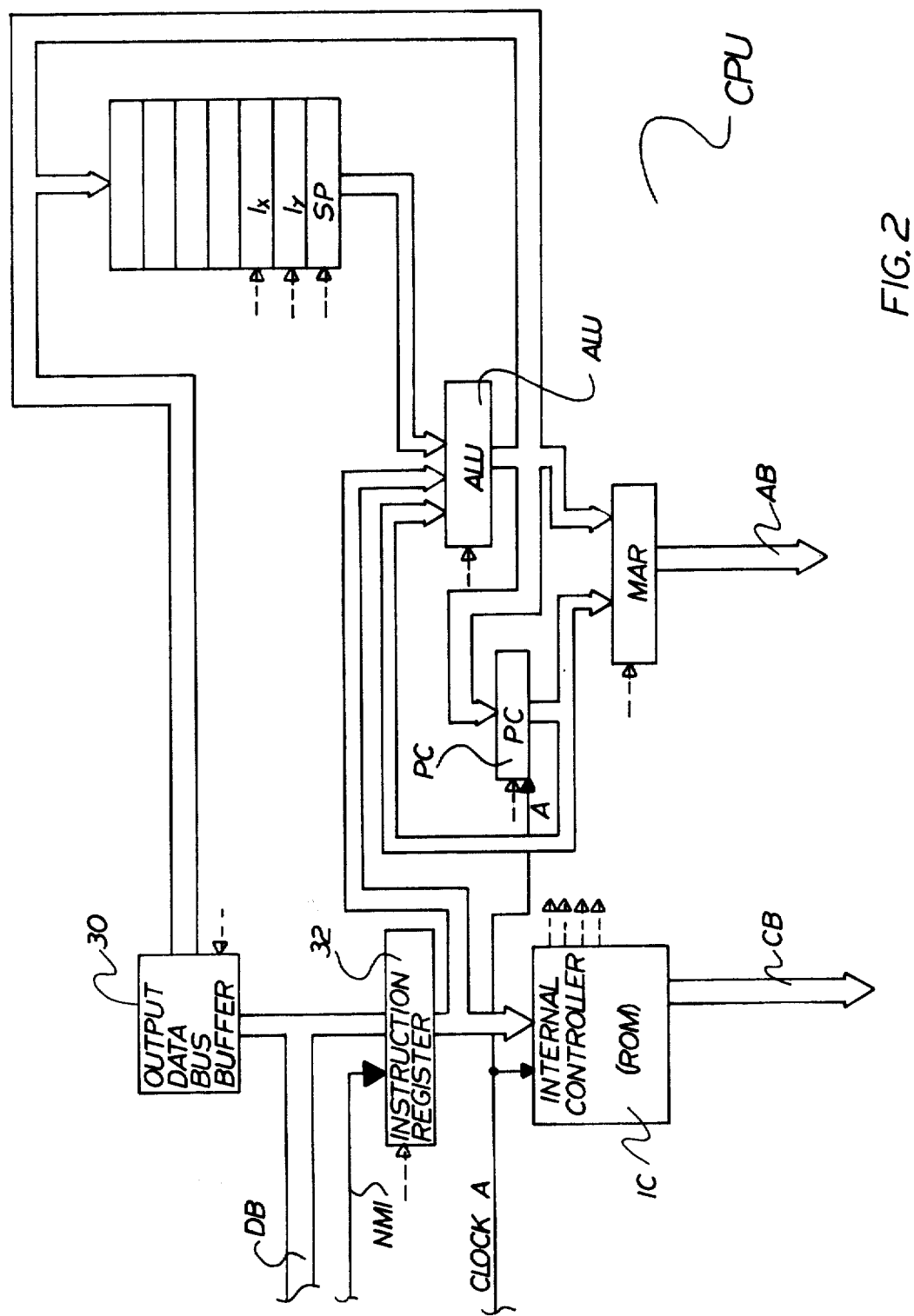
FIG. 2 is a schematic-block diagram illustration of a portion of a CPU usable with the invention.

Reference is now made to FIG. 2 which is a schematic-block diagram illustration of at least a portion of a processing unit, such as the CPU shown in FIG. 1. This diagram is not totally complete but provides sufficient information for a complete understanding of the present invention. As shown in FIG. 2 the CPU includes an internal controller IC which for example may take the form of a read only memory (ROM) which is programmed with internal machine instructions (sometimes called micro instructions). The dotted lines exitting from the controller are control lines which extend through various of the blocks within the CPU for purposes of internal control, in a known manner. Also being outputted from the internal controller IC are various control lines which are generally referred to herein as the control bus CB. The address bus AB may be taken from the output side of a memory address register MAR which operates under the control of the internal controller IC and which has inputs taken for example from an arithmetic logic unit ALU and a program counter PC. The program counter is a sixteen bit register and while shown separately, is typically part of a stack of registers of which several are shown in the upper righthand portion of the diagram. This stack of registers also includes a sixteen bit index register IY and a sixteen bit stack pointer register SP. These registers, including the program counter all provide inputs to the arithmetic logic unit in a known manner. The arithmetic logic unit may provide inputs to the program counter as well as to the stack of registers and from there to the data bus by way of an output data bus buffer 30. Data from the data bus DB as well as interrupts are brought into the CPU and supplied as by way of an input or instruction register 32 which communicates with both the internal controller IC and the arithmetic logic unit ALU. The structure shown is meant to be relatively conventional in the art and, for example, simplifies the Zilog ZAD CPU. Obviously there is more to the internal structure than that shown in FIG. 2 but that which is shown is sufficient for a complete understanding the invention herein.

Within the CPU the program counter PC contains the address of the next instruction to be fetched from external memory. Since this is preferably a sixteen bit register up to 64K bytes of external memory can be addressed to fetch an instruction. The stack pointer SP is also a sixteen bit register and addresses a memory stack area anywhere within an external read/write memory, such as memory 12. Consequently then memory 12 is used for temporary storage of variables in the program, such as storage of the program count in the program counter PC during interrupt processing. Such a procedure will take place when an interrupt is supplied to the CPU from a non-maskable external interrupt line NMI which, as will be seen hereinafter, is a regularly occurring interrupt which is supplied by the video control and timing circuit during a nonvideo time interval. The clock pulses, referred to herein as clock A, for the CPU are provided by the video control and timing circuit.

The instructions that make up a program may be stored in the external memory 10. Each instruction has an address and the instructions are obtained by placing the address on the address bus. The address of the next program instruction is contained in the program counter PC (FIG. 2). This address is updated by adding "1" to the counter each time it fetches an instruction so that the program counter is always current (pointing to the next instruction). Consequently then, an instruction obtained from addressing a known location in memory 10 will be outputted from the memory and placed on the data bus DB which will then be received by the CPU where it is typically placed in an instruction register. This instruction is then used to direct activities during the remainder of the instruction execution. The instructions, stored as eight bit words in memory 10, are known as instruction or operation codes (OP code). The eight bit instruction code is normally sufficient to specify a particular processing operation and, for example, the eight bit stored in the instruction register may be decoded and used to activate one of a number of output lines to initiate some specific action. Fetching and execution of a single instruction makes up what is known as an instruction cycle and this is under control by the clock pulses operating the timing of the CPU. Once an instruction has been fetched and placed in the CPU, the program counter is incremented (in preparation for the next instruction fetch) and the instruction is decoded and the instruction is executed during the remaining period of the instruction cycle. This is a cyclical operation and the processor will continue to fetch an instruction, or OP code and perform the instruction required and then fetch the next instruction, and so on. If the data on the data bus is a no OP code then during the next instruction cycle the processor will fetch the next instruction. In the Zilog Z-80 a no OP code is represented by all zeros in the eight bit word on the data bus DB. Also a restart instruction on the data bus will cause the instruction register to decode the instruction to start a reset or restart operation at some particular address of the instruction memory 10. In the Zilog Z-80 a restart instruction is represented by all ones on the data bus. The no OP and restart instructions will be discussed in greater detail below.

The CPU will operate in a sequential manner by addressing sequentially located areas of memory 10 to obtain OP codes therefrom. This is violated when the OP code is a jump instruction which calls for a subroutine to be executed. The addresses for OP codes in the subroutine are usually located in sequential addresses in a different area of the memory 10. In the Z-80 CPU, the program counter PC is incremented and its contents are stored in a section of memory 12 at an address located by the stack pointer SP (see FIG. 2). Then the processor will load the address for the next call into the program counter so that the next instruction will be fetched at a different area of memory 10. The last instruction in the subroutine will be a return instruction which will then replace the current contents of the program counter with the address located at that area of memory 12 to which the stack pointer is addressing. The processor will then continue the program. An interrupt will cause the processor to jump to a special routine similar to that which results from a jump instruction.

In accordance with the present invention, a direct memory access circuit DMA is obviated by permitting the contents of the program counter to provide the addresses for the data to be fetched from the video memory 14. This operation is initiated by supplying as non-maskable interrupt to the CPU at times when fetching of data is to be made. This interrupt is obtained by raising the NMI line (see FIGS. 1 and 2) which provides an interrupt to the input or instruction register 32. Whereas this interrupt is shown as being supplied by the video control and timing circuit 22 it need not be done in this manner, as any regularly occurring interrupt during periods in which data is to be retrieved from memory 14 and loaded into buffer 20, is sufficient. Obviously this should take place during nonvideo intervals. The CPU responds to a non-maskable interrupt NMI in a conventional manner and causes the contents of the program counter to be incremented by one and stored in a designated area of memory 12 with the address of that area being located in the stack pointer register SP. This interrupt is indicative of a command to start loading the line buffer 20 in the near future. The NMI interrupt, as decoded, changes the contents of the program counter so that the main program execution is temporarily suspended and the processor branches to a routine which eventually causes the contents of the program counter to carry the address of the index register IY. This may be done immediately in response to an NMI interrupt or several preparatory instruction cycles may be used before the program counter is set to the address for addressing the index register IY. The contents of the index register IY in this processor will provide the address of the start of the next video character line as stored in the video memory 14. That is, each line of characters is stored so that the first character in each line has a start address and the address for the next line is always stored in the index register IY and is incremented each time a line of data is fetched from the memory.

With the program counter PC having its contents corresponding with that of the index register IY, the address on the address bus AB will now be an address that addresses the video memory 14 and not the program memory 10. With an OP code fetch command being supplied by the control bus, the memory 14 will be read. During such OP code fetches the Z-80 raises an M1 line on the control bus. A line of data characters then will be read out of memory 14 and loaded into buffer 20 when the buffer memory load line BML is raised. Each character in the line is accessed separately with the first character being at the address initially set by the program counter. As each character is read out, the program counter is incremented by one count to obtain the next address of the next character in the line of characters and so forth. During this period of reading memory 14, a no selected instruction, such as a OP code, is presented on the data bus DB during each fetching operation of the memory. In the case being described, a no OP code is an eight bit word containing all zeros. This is obtained in the preferred embodiment of the invention by employing a decoder 100 which responds to the address on address bus AB during a read operation of memory 14 to decode whether the address is an address in RAM memory 14. If so, then the decoder sets a flip flop 102 to load all zeros into a buffer 104. This buffer, in turn, supplies an eight bit binary word having all zeros onto the data bus DB. Consequently, the processor will operate to fetch another instruction and increment the counter so as to provide the next address to fetch an instruction. Of course, instead of fetching an instruction from memory 10 the address obtained from the program counter, as now incremented, will cause a read of the next character in the memory 14.

This reading of memory 14 will continue until the last character of the line is read out. Buffer 101 is disabled so long as flip flop 102 is set to prevent data outputted from memory 14 from being placed on the data bus DB. During other times the buffer is enabled to permit editing of data etcetera. The last character is accompanied by an end of line code EOL. End of line decoder 106 responds to the data characters outputted from memory 14 and, upon detection of an end of line code EOL, serves to reset flip flop 102 so as to place all ones in the buffer 104 so that an eight bit binary word containing all ones appears on the data bus DB. The significance of all ones on the data bus is that this represents a return or restart instruction for the Z-80 processor. Consequently, when this word is supplied to the instruction register of the processor the return command is decoded to cause the processor to enter into a routine to return the program counter to the address requesting the next instruction prior to the point the NMI interrupt occurred. However, at this point the program counter is set to the address of the end of line character. Since this caused the processor to see a restart or return operation the current address in the program counter will be saved. Consequently then, the current address as incremented by one will be placed into stack (in an area of memory 12) and the address will be placed into the index register IY. During this process the index register will be "popped" and then decremented so that the index register contains the address of the first character in the next character line. The program counter will now be returned from the non-maskable interrupt operation to the address that it was fetching from memory 10 prior to the NMI interrupt so as to resume the operations being processed.

From the foregoing it is seen that an NMI interrupt will cause a routine wherein the contents of the program counter will be set to an address obtained from index register IY. That addresses the first character in the next line of memory 14 to be accessed. However, the processor cannot distinguish this from interrogating or reading memory 10. While data is outputted from memory 14 to load line buffer 20 all zeros defining a no OP code appear on the data bus DB. Since this is interpreted by the instruction register in the CPU as a no OP instruction the processor will index to the next instruction cycle. The program counter is now set to the next address which causes the fetching of a second character in the line of data in memory 14. This will continue until the last character is fetched from memory 14 at which time an end of line character is decoded. This causes a return or restart instruction defined by all ones to appear on the data bus DB. The contents of the program counter are returned to the status prior to the NMI interrupt so that the processor will now fetch the next instruction code from memory 10.

Video Control and Timing

Figure 3:
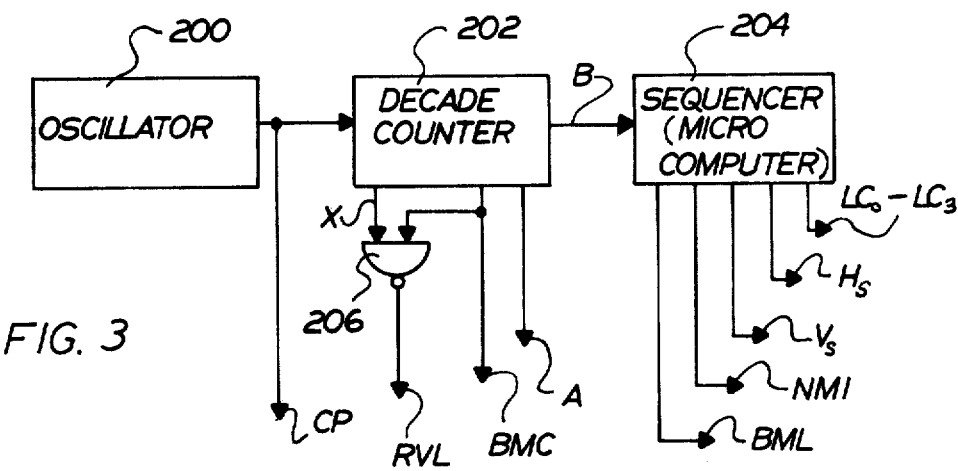
FIG. 3 is a schematic-block diagram illustration of the video control and timing circuitry.
Figure 4:
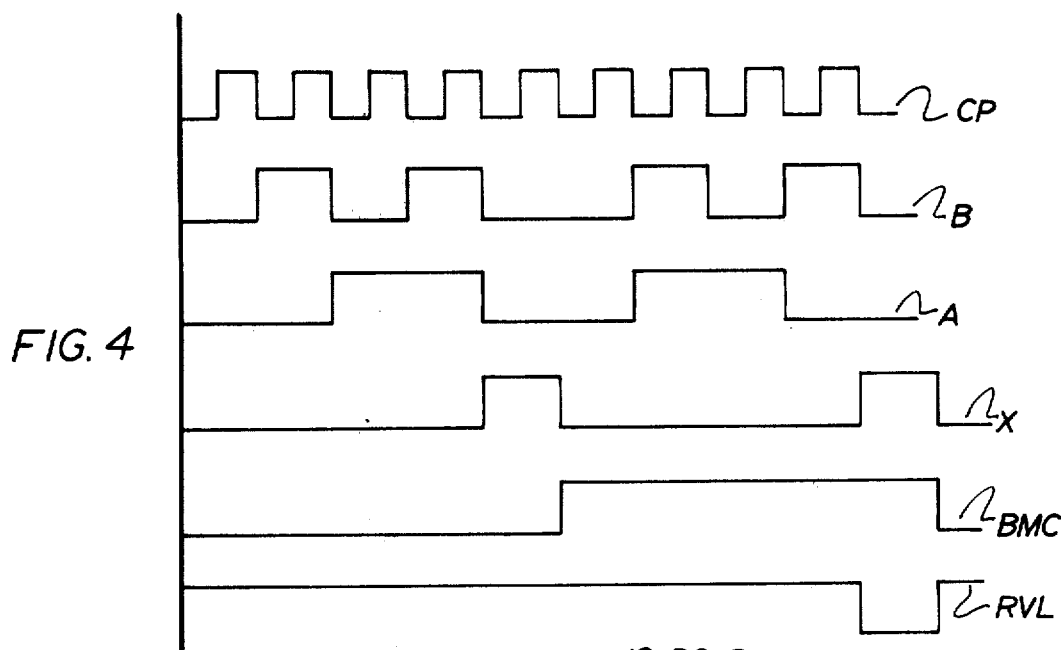
FIG. 4 is is a graphical waveform showing various clock and control signals.

Whereas the NMI interrupt to the CPU may be any regularly occurring signal taking place during a non-video interval, it preferably is provided in accordance with the invention by means of the video control and timing circuit 22. This circuit also provides clock A for the CPU as well as the timing and control for operation of the video display. The video control and timing circuit 22 preferably takes the form as illustrated in FIG. 3 and which briefly includes oscillator 200, a decade counter 202 and a sequence controller 204. The oscillator may take any conventional form in the art used to supply clock pulses for processors and preferably supplies clock pulses CP having a rate on the order of 12 MHz. These clock pulses CP are supplied to the decade counter 202 which, for example, may take the form of Texas Instruments Model 74390 counter. This decade counter is conventional in the art and provides outputs X, BMC, A and B. These are all illustrated by the waveforms of FIG. 4. As seen there a clock B is derived from the basic clock pulses CP and provided to the sequencer 204 for internal timing thereof. Clock A for the CPU (FIG. 1) is derived from clock B. Waveform X is obtained from clock A as is a buffer memory clock BMC which appears once for each group of ten clock pulses CP. The buffer memory clock BMC is the clock supplied to the shift input of the line buffer 20 (see FIG. 1) for clocking character by character into the line buffer. The buffer memory clock BMC and clock X are NANDed together by a NAND gate 206 to obtain a ROM video load signal RVL. This load signal is used for loading the output shift register 24 with the character patterns obtained from character generator memory 23.

Reference is now made to FIG. 5 which illustrates a 7×9 dot matrix on a 10×14 character field. This character field is representative of a typical field for each character whose dot patterns are stored in memory 23. Normally only a possible 7×9 character is visible on the screen of the CRT. Typically the first line of the character field is coded in the memory 22 as blanks with dot patterns being located in the next seven lines. If we consider that the first line corresponds with a line count L0 then dot patterns will be stored in lines corresponding with line counts L1 through L8. The locations corresponding with the next three line counts L9 through L11 are reserved for dot patterns associated with descender characters. The next two lines corresponding with line counts L12 and L13 are blank and provide a vertical inter characterline space. Going horizontally across it is seen that only seven dots of a potential ten dots are available with the other three dot positions providing horizontal intercharacter spacing.

During each raster scan line, a beam moves across the face of the cathode ray tube and as traces a visible portion followed by a nonvisible portion, which we is referred to as a horizontal blanking interval HBI (see FIG. 6). The sequencer 204 will provide a synchronizing signal, referred to as the horizontal synchronization signal $H_S$. That signal, in a conventional fashion, initiates a flyback of the cathode ray tube to its home position on the lefthand side of the screen prior to commencing a second scan line. The sequencer 204 keeps track of the scan lines. For each character line there Is a total of fourteen scan linecounts. This is provided by a binary bit pattern taken on four outputs $LC_0$ through $LC_3$ (FIG. 3). By keeping track of the scan line from the outputs $LC_0$ through $LC_3$ it is known whether the beam is presently scanning within a character field at line L0 or, for example, L12. During the scanning corresponding with line signal L11, that the sequencer 204 raises the nonmaskable interrupt NMI which is applied to the CPU (FIG. 1). This nonmaskable interrupt is raised for the entire scan line and, as will be seen hereinafter, the scan line may, for example, be of an interval corresponding with a potential 800 dot positions across the face of the CRT. During the next two scan lines corresponding with lines 12 and 13 the buffer memory load signal BML is raised, as is indicated in FIG. 5.

In view of the foregoing it is seen that during the intercharacter line spacing periods the nonmaskable interrupt signal is provided to initiate loading of character data from the video memory 14 into the line buffer 20. The loading itself will take place during the scan lines corresponding with line counts 12 and 13 since it is during this interval that the buffer memory load signal is applied to the load input of the line buffer 20. Eight bit character codes are shifted in parallel into the line buffer so that with each clock pulse BMC an eight bit character code is shifted into the line buffer 20. The BMC clock pulses correspond with those shown in FIG. 4 from which it is seen that for each ten dot pulses or clock pulses CP a buffer memory clock pulse BMC is provided. This then corresponds with one buffer memory clock pulse for each character.

Reference is now made to FIG. 6 which schematically illustrates the display face 300 of the CRT. The single character field dot matrix of FIG. 5 may be representative of one portion 302 of screen 300. Obviously the screen is drawn totally out of proportion to its true size but is presented in the manner shown for purposes of the examples being given below. With a 10×14 character field such as that shown in FIG. 5 a convenient number of characters across the face of the CRT will be on the order of 64. With each character having a character width of ten dots, the dimensions may provide in terms of dot spaces, a total screen width of 800 dot spaces of which 640 are used for the characters. The remaining portion, shown to the right side of the screen is a blank interval. This has been referred to herein as the horizontal blanking interval HBI. It is during this interval, for each scan line, that a horizontal synchronization signal $H_S$ is provided by the sequencer control 204. It is provided during this period because this is a nonvisible interval and the signal is used in a known manner for synchronizing the flyback of the CRT beam. Internally within the sequencer, this synchronization signal is provided, for example, during a count of the clock pulses CP for a span of clock pulses 700 through 730, as is indicated by the waveforms of FIG. 7. Although only a single synchronization signal is shown in FIG. 6 it is to be understood that this synchronization signal is provided during the horizontal blanking interval of each scan line. The horizontal synchronization pulses may provide the basis for the line counts, there being a correspondence between the line count and the number of horizontal synchronization pulses for each frame.

Referring again to FIG. 6, there is shown in the lower portion of the screen a blank interval, known herein as the vertical blanking interval VBI. Such an interval is conventional in the art and it is normal to produce, during that interval, a vertical synchronization signal, such as signal $V_S$. The purpose of the signal is to provide synchronization of the vertical deflection signal. Upon production of the signal, circuitry in the video output circuit 26 initiates action whereby there is a vertical flyback of the cathode ray beam to, in this case, the upper portion of the screen. In the example being described herein, each character field requires fourteen scan lines, including the intercharacter line spacing. If there is a total of sixteen visible character lines then 224 scan lines are required out of the possible scan lines available on the screen. If it be assumed that the screen has a possible 260 scan lines and 224 are used for the visible interval (during the potential interval of time during which characters are displayed) then the vertical blanking interval will account for essentially 34 scan lines. It is during these nonvisible scan lines that the vertical synchronization signal $V_S$ is provided by the sequencer 204. In the example being discussed the vertical synchronization signal $V_S$ has a duration on the order of four scan line intervals. This may be done midway within the vertical blanking interval by, for example, providing the vertical synchronization signal $V_S$ during the period of 234 through 237 scan lines. This is provided by keeping track of the number of horizontal synchronization pulses $H_S$ that have been produced during a frame and this is illustrated by the waveforms in FIG. 8.

From the foregoing it is seen that the video control and timing circuit 22 controls the timing of the CPU by providing clock pulses A. Moreover circuit 22 controls when data fetch operation may take place by controlling the timing of the nonmaskable interrupt NMI which is applied to the processor CPU only during a nonvisible interval and which, in the example being given, corresponds with a normal blank scan line, such as scan line L11 (see FIG. 5). During the next two scan lines the circuit 22 provides a buffer memory load signal BML which permits character codes stored in memory 14 to be loaded into the line buffer 20 for one line of character data. The output shift register OSR outputs the dot pattern at a frequency corresponding with the clock pulses CP outputted by oscillator 200 within the control and timing circuit 22. The decade counter 202 provides a bi-quinary count sequence as is shown by the waveforms in FIG. 4. It is from this count sequence that the processor clock A is derived as well as the buffer memory clock pulses BMC and the ROM video load pulses RVL. Clock B is derived from clock pulses CP supplied to the sequencer control circuit 204. Preferably, sequencer 204 is a programmed microcomputer on a single chip such as that supplied by Mostek Corporation and known as their model No. 3870 microcomputer. Preferably, this computer is programmed to respond to the clock pulses B and provide the line count information and synchronization pulses as well as the non-maskable interrupt and the buffer load signal in the manner and at the times described herein.

Although the invention has been described with respect to a preferred embodiment it is to be appreciated that various modifications and arrangements may be made without the parting of spirit and scope of the appended claims.

What is claimed:

1. Apparatus comprising:
   data processing means for manipulating data in response to instructions supplied thereto and having program counter means periodically incremented in response to each said instruction for providing addresses for normally addressing locations in a memory means to obtain said instructions;
   memory means responsive to said addresses for providing said instructions and other data, said memory means having a first group of addressable storage locations for supplying said instructions and a second group of addressable storage locations for supplying other data;
   means for utilizing said other data when obtained from said memory means;
   said data processing means includes means for setting said program counter to a selected count representative of a particular address so that a count may be set representative of a starting address within said second group of storage locations; and
   control means for controlling supply of said other data to said utilization means and including means for supplying a coded data word representative of a selected said instruction to said data processing means for incrementing said program counter so long as said program counter provides addresses corresponding with said second group of addressable storage locations whereby said program counter will be providing addresses to obtain said other data instead of said instructions.

2. Apparatus as set forth in claim 1 wherein a block of said other data is stored in sequential addresses commencing with a said starting address so that a said block of other data may be addressed by sequentially incrementing said program counter from said selected count.

3. Apparatus as set forth in claim 2 including means responsive to data outputted from said second group of locations for terminating said supplying of said selected instruction to said data processing means.

4. Apparatus as set forth in claim 3 wherein said terminating means is responsive to coded data indicative that an entire said block of data has been outputted.

5. Apparatus as set forth in claim 4 wherein said blocks of data are stored as data lines of characters and said coded data is an end of line coded data character.

6. Apparatus as set forth in claim 5 wherein said utilization means includes video display means for displaying representations of said characters and video control means responsive to said data characters for controlling said video display means.

7. Apparatus as set forth in claim 6 wherein said video control means includes line buffer means for sequentially receiving said data lines of characters and controlling display of representatives of same.

8. Apparatus as set forth in claim 7 wherein said means for setting said program counter includes means responsive to a selected interrupt command supplied to said processing means.

9. Apparatus as set forth in claim 8 including means for supplying said selected interrupt command only during periods that a representation of a character is not being displayed.

10. Apparatus as set forth in claim 9 including timing means for controlling the timing sequence of displaying representations of said characters and providing said selected interrupt command during non-character display intervals.

11. Apparatus as set forth in claim 10 wherein said display control means controls said display of character representations one character line at a time and said timing means supplies said interrupt command only during an inter-line time non-character display interval.

12. Apparatus as set forth in claim 1 wherein said memory means includes a read/write memory assigned to said second group of addressable storage locations.

13. A data processing system comprising:
   a data bus;
   an address bus;
   a CPU communicating with each said bus and having a data input for receiving data including instructions from said data bus, a program counter for incrementally supplying a sequence of addresses to said address bus, means responsive to each instruction received from said data bus for initiating execution of same and incrementing said program counter, and means for setting said counter to a selected count representative of a particular address;
   addressable memory means responsive to said addresses on said address bus and having first and second groups of addressable memory locations wherein said first group of memory locations are sequentially addressed for sequentially supplying said instruction data to said data bus and said second group are sequentially addressed for sequentially supplying other data to said data bus; and
   control means responsive to addresses from said address bus addressing said second group of addressable locations for inhibiting the passage of said other data to said data bus and substituting therefore a coded data word representing a selected said instruction for causing said program counter to be incremented.

14. A data processing system as set forth in claim 13 wherein said addressable memory means includes a first addressable memory having said first group of addressable locations and a second addressable memory having said second group of addressable locations.

15. A data processing system as set forth in claim 14 wherein said second memory is a read/write random access memory.

16. A data processing system as set forth in claim 15 wherein said first memory is a read only memory.

17. A data processing system comprising:
a data bus;
an address bus;
a CPU communicating with each said bus and having a data input for receiving data including instructions from said data bus, a program counter for incrementally supplying a sequence of instruction addresses to said address bus for normally addressing an instruction memory, means responsive to each instruction for initiating execution of same and incrementing said program counter, and means responsive to an interrupt command for setting said counter to a selected count representative of a particular address;
an addressable instruction memory storing a sequence of instructions at addressable locations therein and having an input for receiving addresses from said address bus for supplying addressed instructions to said data bus;
an addressable data memory having an input for receiving addresses from said address bus and an output for outputting addressed data;
gating means for normally passing said outputted data from said data memory to said data bus; and
control means responsive to selected addresses on said address bus for actuating said gating means to block passage of said outputted data to said data bus and substitute therefore a coded data word representing a selected said instruction for causing said program counter to be incremented.

* * * * *